Inventor
Max J. Tauschek

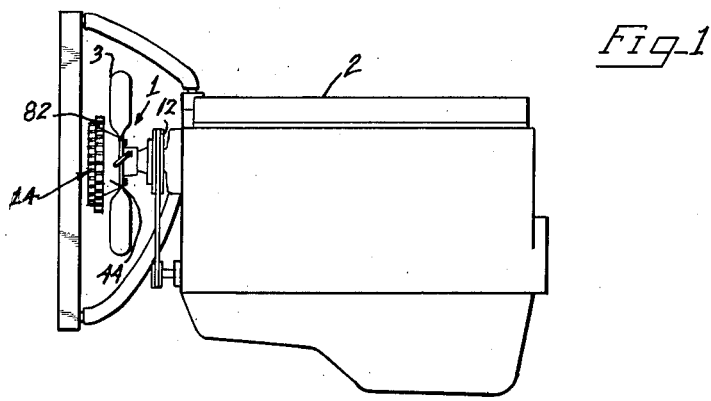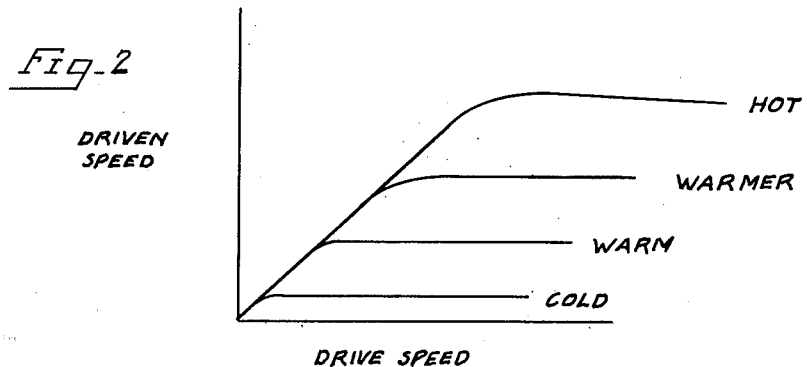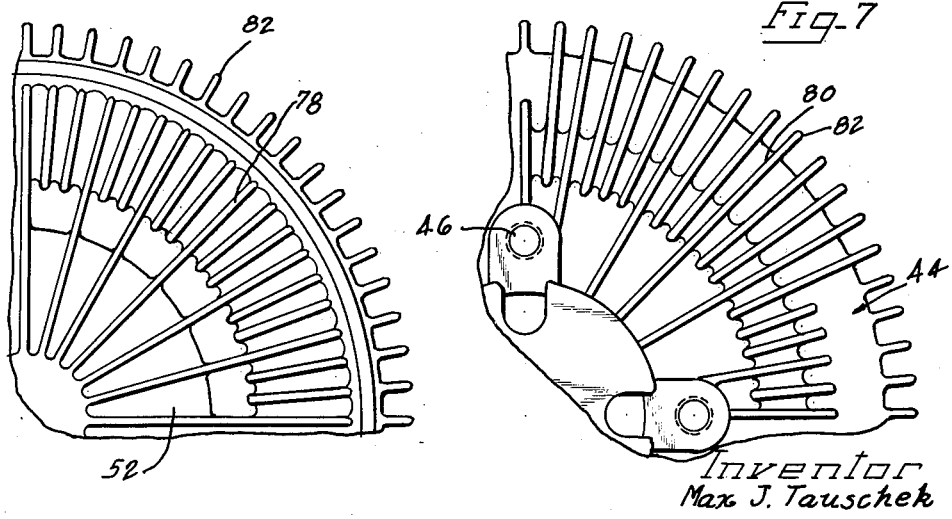

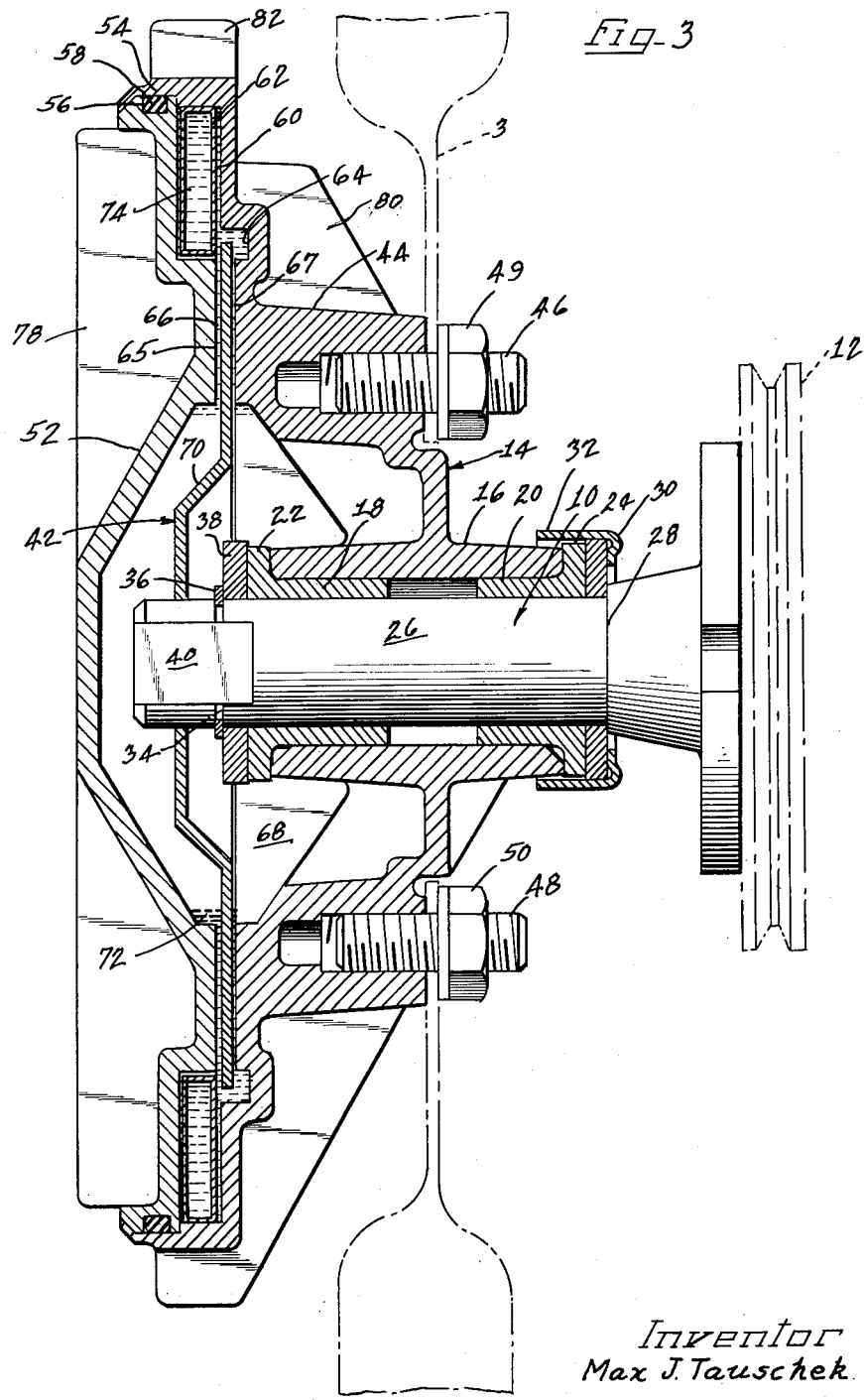

United States Patent Office 3,059,745
Patented Oct. 23, 1962

3,059,745
TEMPERATURE AND SPEED SENSITIVE DRIVE
Max J. Tauschek, Lyndhurst, Ohio, assignor to Thompson Ramo Wooldridge Inc., Cleveland, Ohio, a corporation of Ohio
Filed Mar. 31, 1960, Ser. No. 19,106
4 Claims. (Cl. 192—58)

This invention relates to a drive coupling for use in driving fans or accessories for vehicles or the like, and more particularly to a temperature sensitive drive which is controlled by fluid means in accordance with ambient temperature or speed conditions.

The present invention is a continuation-in-part of my copending application for "Temperature Sensitive Drive," Serial No. 776,617, filed November 26, 1958, now U.S. Patent 2,988,188, granted June 13, 1961, and provides a highly efficient and economical drive construction whose responsiveness to speed or temperature may be determined in a desired proportion, so as to disengage the drive when the car reaches a predetermined speed or when the engine is sufficiently cool.

In accordance with the invention, an expansion chamber of brass, Mylar or other suitable material, is filled with a temperature responsive material such as Freon or the like, the expansion chamber being preferably formed in the shape of an annulus and disposed peripherally in the clutch housing. The clutch housing and clutch cover therefor provide an annular housing chamber receiving said expansible chamber, and this housing chamber is in fluid communication with an inner radially extending coupling space of uniform width formed by the housing and housing cover. A clutch plate is disposed in the coupling space and is mounted on a shaft journalled in the housing for relative rotation, the housing in a preferred form carrying a fan and constituting the driven member, although the housing may also be operated as the drive member and may transmit power through the clutch means to the shaft within the scope of the invention.

The clutch plate is keyed to the shaft in either axially fixed or slight axially slidable relationship thereto, and the housing and housing cover provide a chamber around the shaft which is filled with a quantity of viscous oil such as silicone. This chamber is configured so that when relative rotation is effected between the housing and the clutch plate, centrifugal action will move the fluid into coupling position in the coupling space. The housing provides a coupling surface on each side of the clutch plate so that the coupling action is highly efficient. There is thus no mechanical coupling action, and the clutch plate may be relatively fixed axially, as described.

When relatively high operating speeds are achieved, therefore, centrifugal action will urge the coupling fluid against the expansible chamber and compress the chamber so that less coupling fluid is present in the coupling space, thereby maintaining the speed of the driven member at a suitable level and preventing wear and power loss such as might result from excessive speeds in the driven member. Also, the temperature sensitive characteristic of the expansible chamber causes the said expansible chamber to move the coupling fluid into the coupling space and thus provide clutch engagement to a desirable extent when ambient temperatures are relatively high.

Accordingly, it is an object of the present invention to provide a variable speed fan drive which is responsive to speed or temperature, or both, so as to provide a desired speed for a fan or the like at predetermined speeds or temperatures, and to reduce the coupling action or disengage the clutch when speeds are increased or temperatures are reduced.

Another object of the invention is to produce a fan drive as described which prevents excessive engine loads and wear on driven elements, the elimination of fan noises at high speed and the use of larger fans.

Another object of the invention is to provide a drive as described which may be advantageously used in a wide variety of structures and, for example, is especially suitable for use in driving fans for air-conditioned cars where under-the-hood heat is a problem.

Another object of the invention is to provide a fan drive as described having an annular temperature sensitive expansion chamber which when cooled sufficiently contracts to disengage the fan.

Another object of the invention is to provide a fan drive which, when the engine speed reaches a predetermined amount such as, for example, 3000 r.p.m. or more, contracts the chamber by centrifugal force to disengage the fan.

Another object of the invention is to provide a fan drive which requires less space than previously available drives but which is highly efficient in producing a desired fan speed.

Another object of the invention is to provide an automotive accessory drive whereby the speed of the accessory can be limited to a predetermined value. For example, the drive may have application to a generator to eliminate the hazards of overspeeding the generator which might destroy the electric windings thereof.

Yet another object of the invention is to provide a device as described which may be utilized to energize an air or liquid pump, such as the coolant pump used with a conventional engine, in accordance with the temperature of the engine.

Other objects and advantages of the invention will become apparent as the description proceeds in accordance with the drawings in which—

On the drawings:

FIGURE 1 is a side elevational view of a drive according to the invention in operative relationship to a fan and internal combustion engine;

FIGURE 2 is a diagrammatic showing of temperature and speed relationships which may be achieved in the fan drive of the invention;

FIGURE 3 is a vertical sectional view of a fan drive according to the invention which is primarily responsive to speed;

FIGURE 6 is a front plan view, which is broken away, of the fan drive of the invention illustrating heat dissipating means thereof; and FIGURE 7 is a rear view, which is broken away, of the fan drive of the invention and also illustrating heat dissipating means.

As shown on the drawings:

Figure 4:
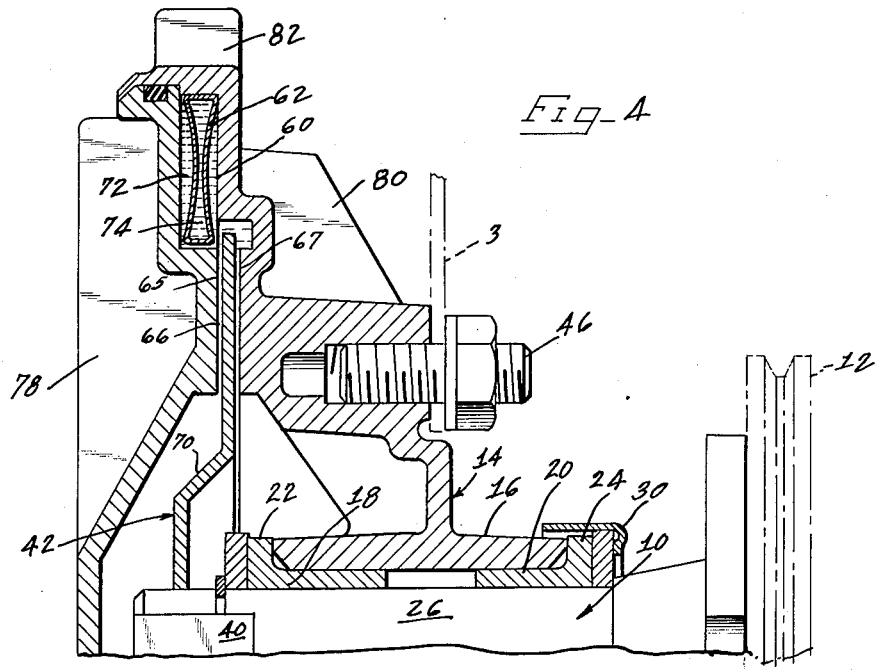
FIGURE 4 is a vertical sectional view, partly broken away, of the structure of FIGURE 3 in a high speed condition.

Referring now to the drawings, and to FIGURE 1 in particular, a temperature sensitive drive 1 is shown in accordance with the present invention in association with an internal combustion engine 2, and a fan 3 driven by the drive 1 as hereinafter set forth. The drive 1 comprises a driving member, a driven member, and clutch means for relating the drive member and driven member in accordance with temperature, speed, or a combination of temperature and speed, and in a preferred form of the invention, a shaft 10 may be the drive member as energized by the engine 2 in accordance with the understanding of those skilled in the art, or, if desired, by pulley means 12.

A housing 14, which in the embodiment shown is the driven member, is journalled for relative rotation on the shaft 10 by means of a bearing sleeve 16 mounted on sleeve bearings 18 and 20 which are flanged at 22 and 24 at their outer ends and received on reduced portion 26 of the shaft 10 at their inner surfaces. It will be understood, however, that the housing 14 may also be used as the drive member. The outer end of the shaft 10 defines a shoulder 28 which engages a thrust washer 30 maintained against the flange 24 of the bearing 20 and covered by a dust shield 32, and the inner end of the shaft 10 is circumferentially recessed at 34 to receive a retainer ring 36 retaining a thrust washer 38 against the flange 22 of the bearing 18.

The inner end of the shaft 10 also defines a flattened segmental surface 40 whereby a clutch plate 42 may be keyed on the said shaft 10, with either free axial movement, or a fixed axial connection being provided as desired. A free axial connection is preferred, in that the clutch plate then automatically centers itself in the clearance space 66 as a result of hydrodynamic forces in the coupling fluid. Thereby, the clearance space 66 may be minimized and the need for close manufacturing tolerances avoided. The housing structure 14 includes a main housing portion 44 to which the fan 3 is secured by studs 46 and 48 and nuts 49 and 50, or the like, and a housing cover portion 52 is press-fitted or otherwise suitably secured to a peripheral, axially extending flange 54 of the cover portion 44, as shown. The periphery of the cover structure 52 is recessed at 56 to receive an O-ring 58 or the like to provide a seal between the main housing portion 44 and the cover portion 52.

In accordance with the invention, the outer portions of the cover structure 52 may be offset, and cooperate with the outer portions of the housing portion 44 to define an annular housing chamber 60 in which is positioned an expansible chamber means 62, as hereinafter further described. The housing portion 44 also defines an annular recess 64 which may receive the outer edge or perimeter of the clutch plate 42, although this edge may be located adjacent the radially inner diameter of the housing chamber 60.

The cover portion 52 and the housing portion 44 also form parallel clutch surfaces 65 and 67 extending radially and cooperating with the clutch plate 42 to define a constant volume coupling space which is received in proximate relationship to the coupling surfaces. The central portions of the housing 14, as defined by the portion 44 and the cover 52, define a radially tapering, relatively enlarged chamber 68, and it will be seen that the clutch plate may be relatively offset to afford a tapered shoulder 70 within the said chamber 68.

The chamber 68 receives a predetermined quantity of viscous fluid 72, such as silicone (e.g. Dow Corning 200–5000 centistokes) for example, and it will be seen that rotation of the shaft 10 will rotate the clutch plate 42 to effect a corresponding rotation of the housing 14 at a ratio depending upon the coupling action of the fluid 72 as determined by speed and temperature as hereinafter further described.

In order to afford speed and temperature sensitive coupling control, the expansible chamber 62 is filled with means responsive to centrifugal loading and temperature which may be heat-responsive fluid such as Freon, acetate, alcohol or other suitable heat-expansive material, this fluid being indicated by reference numeral 74. The chamber means 62 may be formed as a tube of a thin flexible sheet of heat-permeable characteristic, which may be a metallic material such as brass or a plastic material such as Mylar, the chamber being gas tight, resistant to heat, mechanical stress and corrosion and readily compressible and expansible in response to external and internal forces.

It will be seen that in the embodiment of FIGURE 3, the cross-sectionally elongated dimension of the chamber tube 62 extends radially of the drive, so that the device is responsive to speed and to temperature. However, the inherent spring force in the walls of the chamber tube, or other spring force inside the chamber tube affords a device which is primarily speed-responsive when the interior of the chamber type 62 is evacuated or otherwise provided with a non-temperature responsive atmosphere or characteristic.

When the drive of the invention is utilized in a vehicle for driving a fan, the effective temperature acting thereon, i.e., the temperature behind the radiator, is the result of outside air temperature, the temperature of the water in the radiator and the velocity of the air passing through the radiator. The described centrifugal action of the fluid coacts with effective temperature increases to engage the drive by expanding the chamber tube 62 to move the coupling fluid 72 into the coupling space 66.

The outer surface of the cover 52 may be formed with a plurality of preferably radially aligned ribs 78, which may be in the form of fins of varying axial dimensions, and the rear surface on the housing structure 44 may be formed with complementary ribs or fins 80. The upper flange 54 of the housing structure 14 may also have angularly spaced fins or ribs 82 therearound, as shown. These fins minimize temperature differences between the drive and its surroundings such as may result from clutch action by means of the additional heat transfer area afforded. The fins also moderate the effect of air temperature so that the drive can disengage readily at reduced speeds.

When the drive is energized, coupling fluid will be moved circumferentially to the outer portions of the housing. As speed is increased, the force with which the fluid 72 is moved into pressure relationship with the expansible chamber 62 will be increased, and although a direct coupling action will be achieved at relatively low speeds or speeds below a predetermined level, by virtue of the presence of the coupling fluid within the space 66 and the resultant engagement between the clutch 42 and the housing surfaces 65 and 67, increases above, for example, 3000 r.p.m., will compress the expansible chamber 62. This relationship is shown in FIGURE 4, and it will thus be seen that the compressed position or condition of the chamber 62 provides an increase in space in the opening 60 to receive the fluid 72, so that the engagement between the clutch 42 and the clutch surfaces 65 and 67 is correspondingly diminished. The amount of fluid may be calibrated directly in terms of the required point of disengagement or speed reduction, but in any event is sufficient to provide the desired compression of the chamber tube 62, and to afford a reduction in speed ratios between driving and driven members when this compression has been achieved.

The viscosity of the coupling fluid may be determined in accordance with the requirements of a given application. Thus, the drive can be attached to fins of different sizes without the need for changing its physical size. Silicone has been found effective in that its high viscosity reduces the required clutch plate area, and because of its high stability. However, other viscous fluids such as petroleum oil may be utilized within the scope of the invention.

Figure 5:
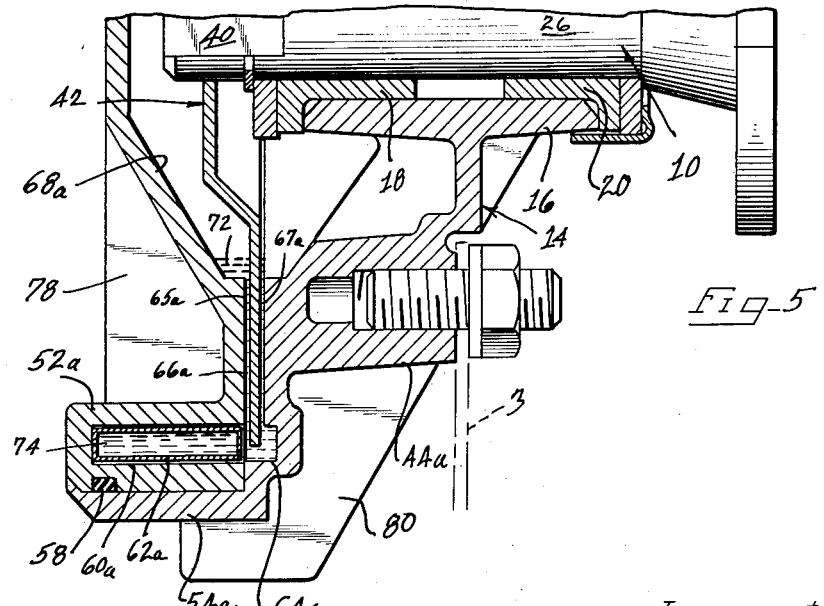
FIGURE 5 is a vertical sectional view, partly broken away, of another embodiment of the invention which is primarily responsive to temperature.

Referring now to FIGURE 5, a second embodiment of the invention is shown which corresponds generally to the embodiment of FIGURES 1, 3 and 4, and wherein similar reference numerals indicate similar parts. However, the embodiment of FIGURE 5 is primarily temperature responsive, and to this end, the flange 54a is extended axially to a considerable extent corresponding to the elongated dimension of an expansible chamber means 62a. The chamber means 62a is received in a chamber space 60a which is aligned axially with the drive shaft 10 rather than radially therewith, as in the preceding embodiment.

A recess 64a is formed in the housing structure 44a so as to afford communication between the chamber space 60a and a constant volume clearance space 66a having opposed clutch surfaces 65a and 67a. The space 66a is in turn in communication with the chamber 68a, with a clutch plate 42 being disposed in parallel rotatable relationship in the space 66a. With the fluid 74 affording a very large change in pressure in respect to a given temperature change, and the chamber means 62a operated at a relatively high pressure, the effects of temperature on the volume of the chamber are paramount as compared with the effects of centrifugal force.

Referring now to FIGURE 2, the action of the drive of FIGURE 3 is shown graphically during high speed rotation of the clutch plate 42, indicating that driven speed will be relatively low in comparison with driving speed under conditions of relatively low temperature, since the expansible chamber 62 will thus be easily compressed and the fluid within the chamber means 62 will then be in a contracted condition. As the temperature increases, however, the chamber means 62 expands correspondingly so that driven speeds may be achieved which are of increasingly higher ratio to driving speeds. This same action occurs in the operation of the drive of FIGURE 5.

There has thus been provided a fan drive which is exceptionally compact, simple in construction, as compared with previously available devices and is also highly efficient in utilizing engine power only to the extent necessary. Because of the said simplicity of the construction, fan noises at high speed are eliminated, and larger fans, particularly for air-conditioned cars or the like, may be used without difficulty. The only moving mechanical parts, with the exception of the expansible chamber, are the driving and driven elements; and because the expansible chamber is located peripherally of the clutch, centrifugal force effects on the said chamber may be maximized in the first embodiment in that the gas pressure in the chamber and the centrifugal force of the working or coupling fluid act on equal surfaces. It may be noted in this connection that a relatively large effect on centrifugal force is particularly useful in assuring that the clutch will disengage at high speeds despite temperature effects. Also the amount of coupling fluid needed is kept to a minimum by the construction of the invention, so that economies in manufacture are afforded, while the use of coupling surfaces on each side of the clutch plate provides a highly efficient coupling action.

Although the device has been illustrated as affording clutch disengagement or reduction in engagement at either a predetermined temperature or speed of the drive, various ratios between these two factors may be afforded within the scope of the invention. Also, by varying the amount of coupling fluid, or the amount of temperature sensitive fluid in the expansible chamber of the invention, the engagement of the clutch may be made to occur in response to relatively high speeds or temperatures, or otherwise varied as desired. And either the housing structure or the clutch plate structure may be used as the driving or driven element without difficulty, while the solid bearings for the shaft provide self-lubricating action over extended periods of time. Also, the drive may be used for varying power transmission requirements by simply varying the viscosity of the coupling fluid.

In an arrangement where the housing 14 is the driving member as by being directly coupled to the driving pulley and the clutch plate 42 is the driven member, the clutch plate speed increases in approximate relation to speed of the housing until a maximum point is reached beyond which the speed of clutch plate rapidly diminishes and eventually reaches a condition of substantial rest. The maximum speed for such a drive is determined by the temperature and expansion characteristic of the fluid 74.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a temperature and speed sensitive drive coupling adapted for use in effecting operation of a cooling fan,
    means defining a rotary housing,
    a rotary driving member in said housing,
    said housing and said driving member having opposed surfaces in fluid coupling spaced relation,
    viscous coupling liquid in said housing to afford a fluid coupling between said opposed surfaces,
    a chamber provided by said housing adjacent the perimeter of said driving member,
    the ratio of coupling liquid to the total volume of said chamber being such that in the high speed rotation of the driving member substantially all of the liquid tends to displace centrifugally into said chamber without effecting a coupling between said opposed surfaces,
    and expansible and contractible pressure and temperature responsive means normally substantially filling said chamber but contractible under centrifugal force loading by said liquid to accommodate the liquid in the chamber but acting when heated to expand and force the liquid from the chamber into coupling relation between said opposed surfaces.

2. In a temperature and speed responsive drive coupling as defined in claim 1, said driving member comprising a radially extending clutch plate, and said chamber and said pressure and temperature responsive means being disposed in axially offset relation adjacent to the perimeter of the clutch plate, with an annular recess in the housing receiving the perimeter of the clutch plate and effecting communication with said chamber.

3. A temperature and speed responsive drive coupling as defined in claim 2, said chamber and pressure and temperature responsive means being cross-sectionally elongated radially.

4. A temperature and speed responsive drive coupling as defined in claim 2, said chamber and pressure and temperature responsive means being cross-sectionally elongated axially.

References Cited in the file of this patent

UNITED STATES PATENTS

| | | |
|---|---|---|
| 923,565 | Newcomb | June 1, 1909 |
| 2,015,626 | Heath | Sept. 24, 1935 |
| 2,629,472 | Sterner | Feb. 24, 1953 |
| 2,738,048 | Douglas | Mar. 13, 1956 |
| 2,879,755 | Weir | Mar. 31, 1959 |
| 2,902,127 | Hardy | Sept. 1, 1959 |

FOREIGN PATENTS

| | | |
|---|---|---|
| 534,492 | Italy | Oct. 17, 1955 |